UNITED STATES PATENT OFFICE.

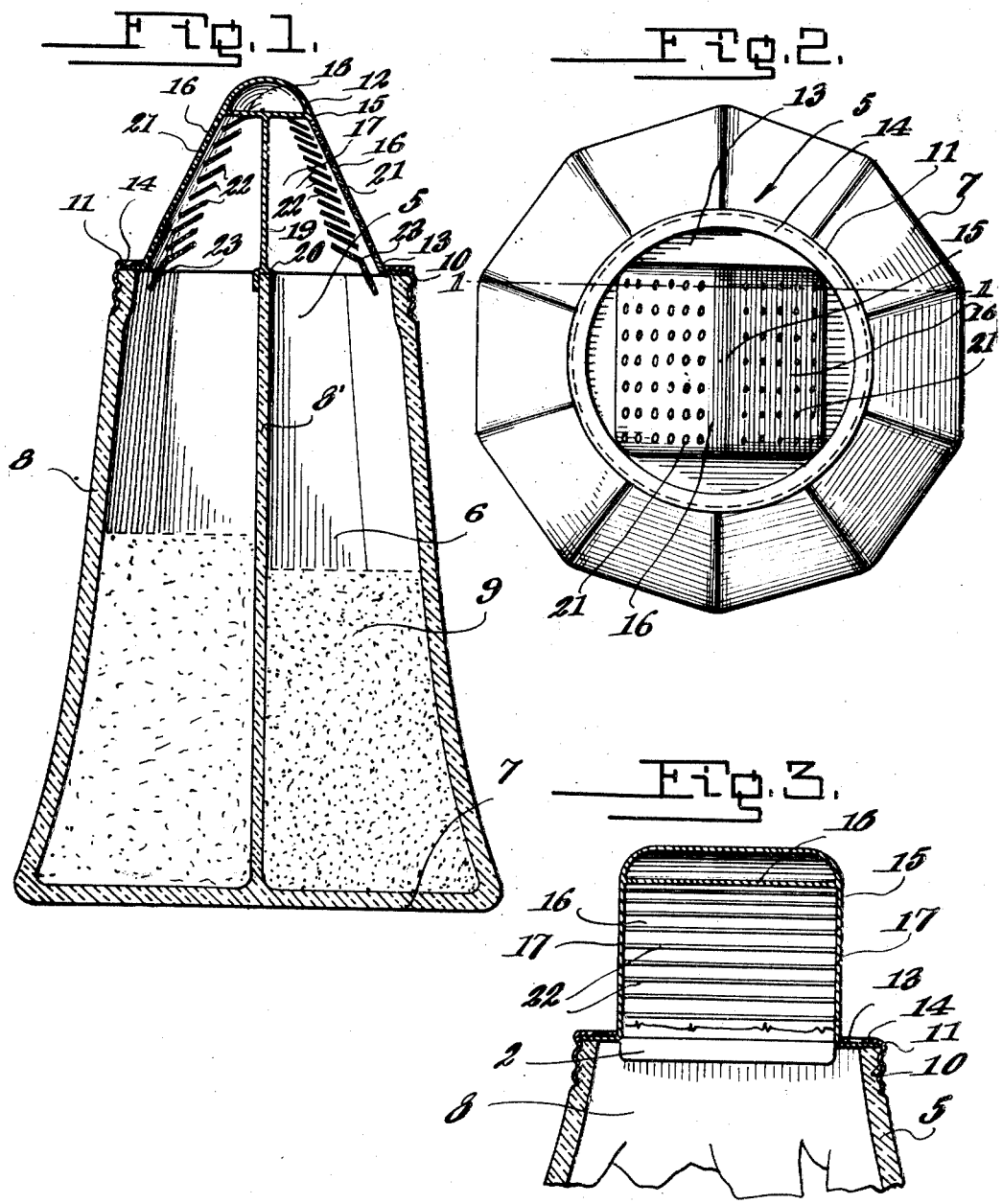

OTTO M. VOGEL, OF TABER, ALBERTA, CANADA.

COMBINED SALT AND PEPPER SHAKER.

1,349,795.     Specification of Letters Patent.    Patented Aug. 17, 1920.

Application filed January 6, 1920. Serial No. 349,669.

*To all whom it may concern:*

Be it known that I, OTTO M. VOGEL, a subject of the King of Great Britain, residing at Taber, Province of Alberta and Dominion of Canada, have invented certain new and useful Improvements in Combination Salt and Pepper Shakers, of which the following is a specification.

This invention relates to salt and pepper shakers, and the primary object of the invention is to provide an improved shaker so constructed as to contain both salt and pepper and thus eliminate the necessity of providing separate salt and pepper shakers.

A further object of the invention is to provide an improved combination pepper and salt shaker having an improved means for permitting the flow of one of the condiments in the holder and for retarding and eliminating of the flow of the other condiment, so as to prevent the mixing of the two when the shaker is being used.

A further object of the invention is to provide an improved combination pepper and salt shaker, having a separate compartment formed therein for the salt and pepper and having oppositely disposed outlets for the same, so as to limit the accidental flow of one of the condiments while the other is being shaken on the articles of food.

A still further object of the invention is the provision of an improved baffle arranged adjacent to the outlets of the salt and pepper, which is so constructed as to permit the free flow of one of the condiments when the salt and pepper shaker is arranged in a certain position and absolutely prevent the escape of the other condiment.

A still further object of the invention is to provide an improved combination salt and pepper shaker of the above character which is durable and efficient in use, one that is simple and efficient to manufacture, and one which can be placed upon the market at a reasonable cost.

Other objects of the invention will appear in the following detail description, taken in connection with the drawings, in which drawings:

Figure 1 is a vertical longitudinal section through the improved shaker, taken on the line 1—1 of Fig. 2.

Fig. 2 is a top plan view of the same.

Fig. 3 is a fragmentary vertical longitudinal section taken at right angles to Fig. 1.

Referring to the drawings, in detail, wherein similar reference characters designate corresponding parts throughout the several views, the numeral 5 indicates the improved salt and pepper shaker, which includes the hollow body or receptacle 6 which can be constructed of any preferred material and of any desired configuration and as shown the body 6 is polygonal shaped and gradually flared toward its lower end to provide an enlarged base 7, so as to prevent the easy upsetting of the shaker.

The body 6 has formed therein a vertical longitudinally extending partition 8' which extends diametrically across the body and divides the same into a pair of compartments 8 and 9 which are adapted to contain salt and pepper respectively. The upper end of the body is provided with external screw threads 10 for the reception of the threaded retaining ring 11, which is adapted to hold the cap 12 in operative position, on the body.

The cap 12 includes a flat circular base 13 which is adapted to engage the upper edge of the body and the retaining ring 11 is provided with an inwardly extending annular flange 14 which is adapted to engage the outer surface of the flat base 13 and firmly clamp the same in position on the body. The flat base 13 is provided with an upstanding centrally disposed extension or casing 15 which includes the downwardly inclined or sloping side walls 16, which extend toward the front wall of the pepper and salt compartments, and are connected by vertical side walls 17. The sloping walls 16 are connected adjacent their upper walls by a horizontal plate or brace 18, and this brace carries a depending vertical plate or central partition 19 which divides the extension or casing 15 into two sections or outlets for the salt and pepper compartments. The lower end of the vertical partition or plate 19 extends below the upper edge of the body 6 of the shaker and is provided with an inverted U-shaped extension 20 which is adapted to engage the upper edge of the central partition 8', and the inverted U-shaped extension prevents shifting movement of the cap in relation to the compartments, so as to hold the sections of the cap in correct relation to the compartments 8 and 9 of the shaker and prevent the shaking of the salt and pepper between the partition or plate 19 and the partition 8' and thus eliminating the likelihood of the pepper and salt becoming mixed.

The inclined walls of the extension 15 are provided with a plurality of openings 21 to permit the flow of the salt and pepper therethrough, and the openings 21 formed in the inclined wall of one of the compartments are formed smaller and closer together so as to retard the flow of the pepper to a certain extent.

The sections or outlets of the extension 15 are provided with a plurality of equi-distantly spaced downwardly inclined overlapping baffle plates 22 which extend across the sections and are secured to the end walls 17, and the baffle plates are arranged adjacent to the sloping walls 16 of the extension 15.

The lowermost baffle plates are formed relatively wider than the other baffle plate as shown at 23, and extend below the lower surface of the cap 12, and are spaced farther from the walls 16, so as to permit the quick return of the condiments when the device is turned to an upright position.

The baffle plates located in the pepper compartment are arranged relatively closer than the baffle plates arranged in the salt compartment, and there are more baffle plates in the pepper compartment than in the salt compartment.

In operation of the improved device when it is desired to shake one of the condiments from the holder, for instance the salt, the shaker is tilted to a horizontal position toward the left and the salt engaging the baffle plates is guided downward to the openings 21 formed in the inclined wall 16. The pepper lying on the opposite side of the partition 8' and the plate or partition 19 of the cap will be prevented from flowing out through the openings 21 formed in the opposite inclined wall 16 owing to the fact that the baffle plates adjacent this wall will be inclined upwardly and thereby prevent the flow of the pepper.

From the foregoing description it can be seen that an improved pepper and salt shaker has been provided of exceptionally durable and efficient construction which will absolutely prevent the flow of one of the condiments while the other condiment is being used.

Changes in details may be made without departing from the spirit or scope of my invention; but,

I claim:

1. A condiment holder including a body having a central partition arranged therein dividing the same into a pair of compartments, a detachable cap carried by the body, a partition carried by the cap and arranged to detachably engage the partition carried by the body, the cap having oppositely inclined walls arranged on the opposite sides of the partition, said walls having a plurality of openings formed therein, and baffle plates arranged adjacent to the walls.

2. A condiment holder comprising a body having a vertical longitudinal partition formed therein arranged to divide the body into a pair of separate compartments, a cap detachably associated with the body and having a partition formed therein arranged to engage the partition formed in the body, an outwardly extending extension formed on the cap, said extension having oppositely disposed inclined walls arranged on the opposite sides of the partition, said walls having a plurality of equi-distantly spaced openings formed therein, and a plurality of baffle plates arranged adjacent to the walls, the lowermost baffle plates extending below the lower surface of the cap and inward of the inclined walls thereof.

3. A condiment holder including a body, a vertical longitudinally extending partition arranged in the body, a cap detachably associated with the upper end of the body, a partition arranged in the cap adapted to detachably engage the partition in the body, said cap having downwardly extending oppositely inclined side walls, the walls having a plurality of apertures formed therein, and a plurality of downwardly and outwardly inclined overlapping baffle plates carried by the cap and arranged adjacent to said inclined walls.

4. A condiment holder including a hollow body having a longitudinally extending partition formed therein, a cap associated with the body including oppositely disposed outwardly inclined side walls and a circular base arranged to engage the upper edge of the body, a retaining ring adapted to engage the body and cap, a central partition carried by the cap having a U-shaped lower end arranged to engage the upper end of the partition arranged in the body, a plurality of downwardly and outwardly inclined baffle plates arranged adjacent to one of the inclined walls of the cap, and a plurality of downwardly and outwardly inclined equidistantly spaced baffle plates arranged adjacent to the other inclined wall of the cap, said last mentioned baffle plates being arranged relatively closer together than the other mentioned baffle plates.

In testimony whereof I affix my signature, this 20th day of December, 1919.

OTTO M. VOGEL.

Witnesses:
JOS. SNEDDON.
GEO. SUNDAL.